United States Patent [19]
Quack

[11] 3,853,423
[45] Dec. 10, 1974

[54] HORIZONTAL DRILLING AND MILLING MACHINE WITH A HEADSTOCK MOVABLE UPWARDLY AND DOWNWARDLY ON GUIDING MEANS

[75] Inventor: Paul Quack, Rheydt, Germany

[73] Assignee: Scharmann & Co., Rheydt, Germany

[22] Filed: Sept. 25, 1972

[21] Appl. No.: 292,261

[30] Foreign Application Priority Data
Sept. 25, 1971 Germany.............................. 2147985

[52] U.S. Cl.............. 408/235, 90/11 F, 90/DIG. 28
[51] Int. Cl.............................................. B23b 47/26
[58] Field of Search...... 408/235; 90/11 R, DIG. 28, 90/11 F

[56] References Cited
UNITED STATES PATENTS

| | | | |
|---|---|---|---|
| 3,168,000 | 2/1965 | Deflandre........................ | 408/235 X |
| 3,671,133 | 6/1972 | Galbarini et al..................... | 408/235 |
| 3,684,395 | 8/1972 | Nurakami............................ | 408/235 |
| 3,707,333 | 12/1972 | Kitamura et al..................... | 408/235 |

FOREIGN PATENTS OR APPLICATIONS

| | | | |
|---|---|---|---|
| 15,126 | 7/1916 | Great Britain...................... | 408/235 |
| 885,426 | 12/1961 | Great Britain...................... | 408/235 |

Primary Examiner—Andrew R. Juhasz
Assistant Examiner—Z. R. Bilinsky
Attorney, Agent, or Firm—Walter Becker

[57] ABSTRACT

A horizontal drilling and milling machine with a counter weight pivotally suspended on a pair of chains, one of which can be adjusted in conformity with the horizontal movement of a supporting sleeve, whereby the counter weight is tilted and its center of gravity is displaced in conformity with the displacement of the overall center of gravity of the machine.

4 Claims, 1 Drawing Figure

PATENTED DEC 10 1974
3,853,423
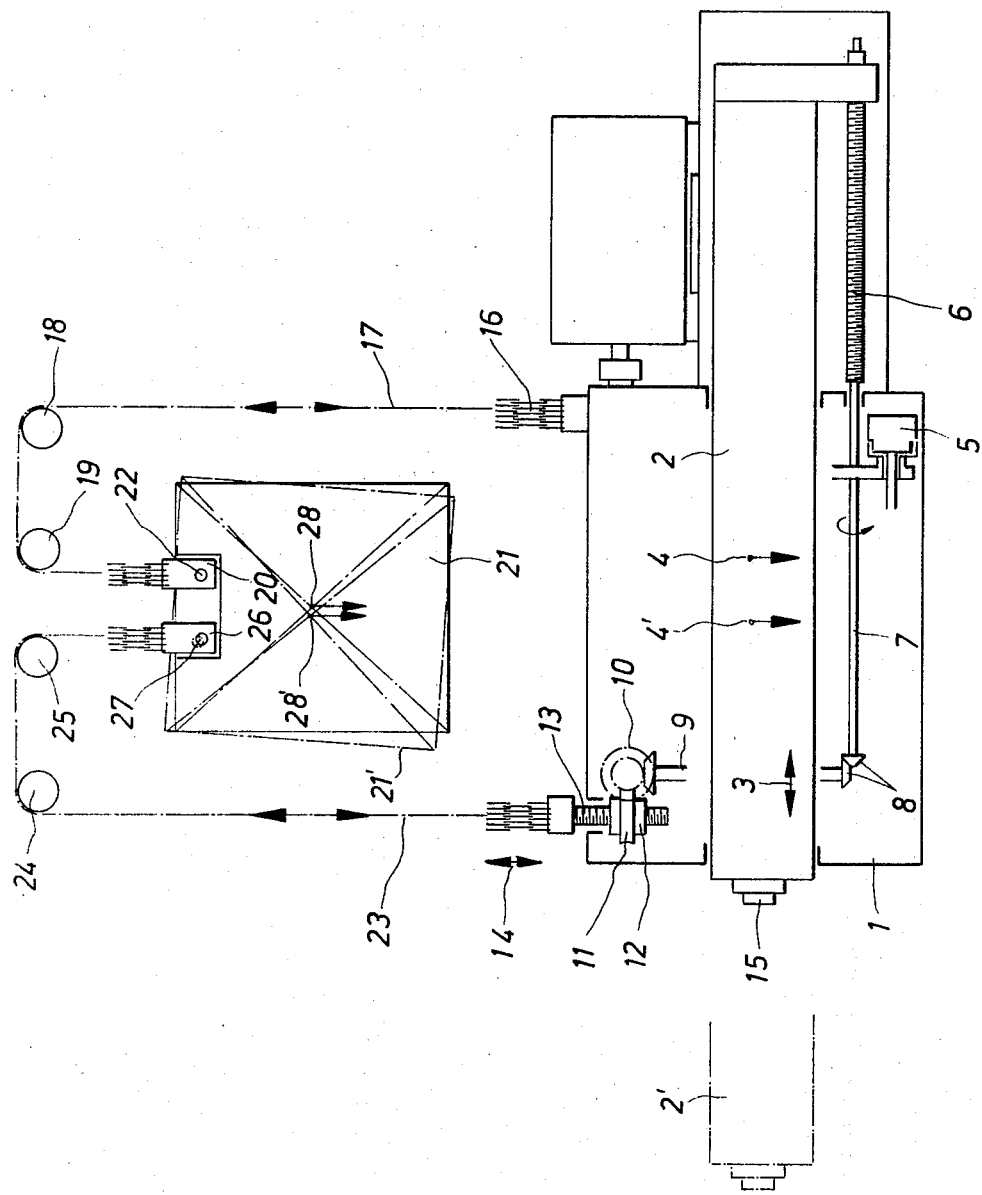

HORIZONTAL DRILLING AND MILLING MACHINE WITH A HEADSTOCK MOVABLE UPWARDLY AND DOWNWARDLY ON GUIDING MEANS

The present invention relates to a horizontal drilling and milling machine with a headstock assembly movable upwardly and downwardly on guiding means, the headstock having associated therewith a supporting sleeve or the like which is displaceable horizontally relative to the saddle member of the headstock assembly. More specifically, the invention concerns a drilling and milling machine of this type with a counter weight connected to the headstock through chains which are arranged in pairs in or parallel to the path of movement of the supporting sleeve or the like. Instead of the supporting sleeve, the headstock assembly may also be provided with another differently designed element, for instance, a lower arm which is displaceable horizontally.

When the supporting sleeve moves out of the headstock, a displacement of the center of gravity of the spindle head and supporting sleeve connected thereto occurs with horizontal drilling and milling machines. If this displacement of the center of gravity is not taken into consideration, an undesired reduction in the precision of the feeding of the tool will result due to the elastic deformation of the guiding means of the headstock assembly.

It is, therefore, an object of the present invention to provide a horizontal drilling and milling machine of the described general character in which means are provided which will reduce or entirely eliminate the reduction in precision resulting from a displacement of the center of gravity.

It is another object of this invention to provide a drilling and milling machine as set forth in the preceding paragraph, in which the means for eliminating or reducing the decrease in the precision of the machine as caused by a displacement of the center of gravity can be realized at low cost and can easily be controlled by the operator of the machine.

These and other objects and advantages of the invention will appear more clearly from the following specification in connection with the accompanying drawing diagrammatically illustrating an embodiment of the invention.

The horizontal drilling and milling machine according to the present invention is characterized primarily in that the location of the center of gravity of the counter weight is variable by shortening or lengthening at least one of the connecting chains between the headstock assembly and the counterweight in or approximately in horizontal direction.

According to a further development of the invention, the shortening or lengthening of the chain is effected in conformity with the movement of the supporting sleeve relative to the headstock saddle member. To this end, according to the invention, one of the two chains of the pair of chains is connected to a pin or pivot or the like which is adjustable on the headstock saddle member mechanically, hydraulically or electrically in the pulling direction of the chain. The chain pin may be adjusted by the feed drive or the threaded spindle for the feed of the supporting sleeve.

According to a practical design of the present invention, that end of each chain which is connected to the counter weight is pivotally connected thereto in such a way that the counter weight may occupy a tilted or inclined position while the chains remain in their position in which they are guided from the headstock over reversing rollers to the counter weight.

Referring now to the drawing in detail, in the headstock assembly 1 the supporting sleeve 2 is adjustable in the direction of the double arrow 3 from the position shown in solid lines to the position 2' shown in dot-dash lines. In this connection the overall center of gravity 4 of the headstock assembly and those parts which are arranged thereon including the supporting sleeve are displaced into the position 4'.

The described horizontal movement of the supporting sleeve 2 relative to the headstock assembly 1 is effected by a feed drive, the coupling 5 and the threaded spindle 6 which latter is continued by a shaft 7 the front end of which has arranged thereon a bevel gear drive 8. By means of the bevel gear drive 8 an intermediate shaft 9 is adapted to be actuated which in its turn actuates a second bevel gear drive 10. The bevel gear drive 10 drives a worm drive 11 of a rotating nut 12. When the nut 12 rotates, the threaded journal 13 is longitudinally adjusted in the direction of the double arrow 14. The rotating nut 12 is mounted in the headstock 1 at the front section which is adjacent to the boring spindle 15 of the supporting sleeve 2.

That end or section of the headstock 1 which face away from the journal 13 is engaged by the connecting means 16 connecting a chain 17 to the headstock assembly, chain 17 being passed over two deviating rollers 18, 19 to the connecting plate 20 of the counterweight 21. Plate 20 is pivotally connected to the counterweight 21 at 22.

Connected to the journal 13 is a second chain 23 which is passed over deviating rollers 24, 25 to a second plate 26 which is likewise pivotally arranged at 27 on the counterweight 21. The journal 13 and the chain connecting means 16 as well as the chains 17, 23 and the plates 20, 26 are located in the plane of displacement of the supporting sleeve or in a plane parallel thereto.

Instead of the illustrated two chains 17, 23, two chain pairs each may be provided which engage the four corners of the headstock but, as illustrated in the drawing, have the same points of attack at the front and rear end of the headstock while the pivotable plates 20, 26 engage the counterweight at both sides thereof.

By adjusting the journal 13 in its longitudinal direction, the chain 23 has its effective length shortened or extended so that the counterweight 21 will occupy an inclined position. According to the specific showing in the drawing, the counterweight 21 has by an effective shortening of chain 23 been brought into the dot-dash line position 21' while a displacement of the center of gravity 28 of the counter weight to the position 28' resulted. Due to this displacement of the center of gravity, the pulling force of chain 23 will be increased so that also at the front section of the headstock assembly an upwardly directed higher pulling force will be exerted than in the starting position of the counterweight.

Inasmuch as the drive of the journal 13 is effected through shaft 7, bevel gear drives 8, 10 and shaft 9 as well as through the worm drive 11 and the nut 12, the displacement of the center of gravity 28 of the counterweight is strictly dependent on the movement of the supporting sleeve from its starting position into a moved-out position, while a displacement of the center of gravity of the entire headstock system including the adjustable supporting sleeve from 4 to 4' corresponds to a displacement of the center of gravity 28 to 28'.

Instead of the mechanical drive of the journal 13 through shaft 7, 9 and the bevel gear drives 8, 10, also a hydraulic or electric conveying device may be employed.

It is, of course, to be understood that the present invention is, by no means, limited to the particular showing in the drawing but also comprises any modifications within the scope of the appended claims.

I claim:

1. In a horizontal drilling and milling machine, a vertical support, a headstock assembly comprising a saddle member guided for vertical movement on said support, and a tool holding sleeve means horizontally displaceable in said saddle member, a counterweight, at least two flexible means on said support for connecting the counterweight to said saddle member for vertically balancing said assembly in a substantially transverse vertical plane containing the center of gravity of said assembly, actuating means to move said sleeve means of said headstock assembly horizontally in said saddle member, and transmission means including at least one rotatable means connected to at least one flexible means for interconnecting said actuating means and at least one of said flexible means to effect a variation in length of said at least one flexible means in response to the movement of said supporting sleeve relative to said headstock assembly to maintain said supporting sleeve in a predetermined horizontal orientation.

2. A machine according to claim 1, in which said flexible means are chain means.

3. A machine according to claim 2 in which all of said chain means have one end thereof pivotally connected to said counterweight.

4. A machine according to claim 1, in which said rotatable member is supported directly by said headstock assembly.

* * * * *